United States Patent [19]
Gschwend et al.

[11] Patent Number: 5,895,179
[45] Date of Patent: Apr. 20, 1999

[54] DRILL

[75] Inventors: Hans Gschwend, Buchs, Switzerland; Fritz Mark, Mäder, Austria; Edwin Schweizer, Balzers, Liechtenstein

[73] Assignee: Hilti Aktiengesellschaft, Schaan, Liechtenstein

[21] Appl. No.: 09/080,876

[22] Filed: May 18, 1998

[30] Foreign Application Priority Data

May 16, 1997 [DE] Germany .................. 197 20 589

[51] Int. Cl.⁶ .................................................. B23B 31/117
[52] U.S. Cl. ................ 408/226; 175/398; 175/414; 408/224; 408/229
[58] Field of Search ............................ 408/226, 225, 408/224, 223, 227, 229, 230; 175/398, 399, 401, 414

[56] References Cited

U.S. PATENT DOCUMENTS

| | | |
|---|---|---|
| 2,773,672 | 12/1956 | Holmes et al. . |
| 4,212,569 | 7/1980 | Anderson et al. ............ 408/226 |
| 4,605,347 | 8/1986 | Jodock et al. ............ 408/225 |
| 4,635,738 | 1/1987 | Schillinger et al. . |
| 4,728,231 | 3/1988 | Kunimori et al. ............ 408/144 |
| 5,007,911 | 4/1991 | Baker ............ 408/224 |
| 5,165,494 | 11/1992 | Barr ............ 175/399 |
| 5,186,268 | 2/1993 | Clegg ............ 175/398 |
| 5,273,380 | 12/1993 | Musacchia ............ 408/227 |
| 5,423,824 | 6/1995 | Akerfeldt et al. . |
| 5,584,617 | 12/1996 | Houser ............ 408/1 R |
| 5,664,914 | 9/1997 | Taniguchi ............ 408/224 |

FOREIGN PATENT DOCUMENTS 9704908  2/1997  WIPO .

*Primary Examiner*—Daniel W. Howell
*Assistant Examiner*—Adesh Bhargava
*Attorney, Agent, or Firm*—Anderson, Kill & Olick, P.C.

[57] ABSTRACT

A drill including an elongate shaft (2) a rear end (5) of which is formed as a shank, and a drilling head (10) provided at the front end of the shaft (2) and having central cutting edges (11, 12) extending from a leading center point (14), which is provided substantially at an extension of a shaft axis, backward toward a circumference of the drilling head, and at least one minor cutting edge (13) a portion (n) of which extending transverse to the shaft axis projects beyond a circumference of the shaft (2), with the projecting portion (n) having a length equal from about 10% to 100% of an entire length of the minor cutting edge.

13 Claims, 4 Drawing Sheets

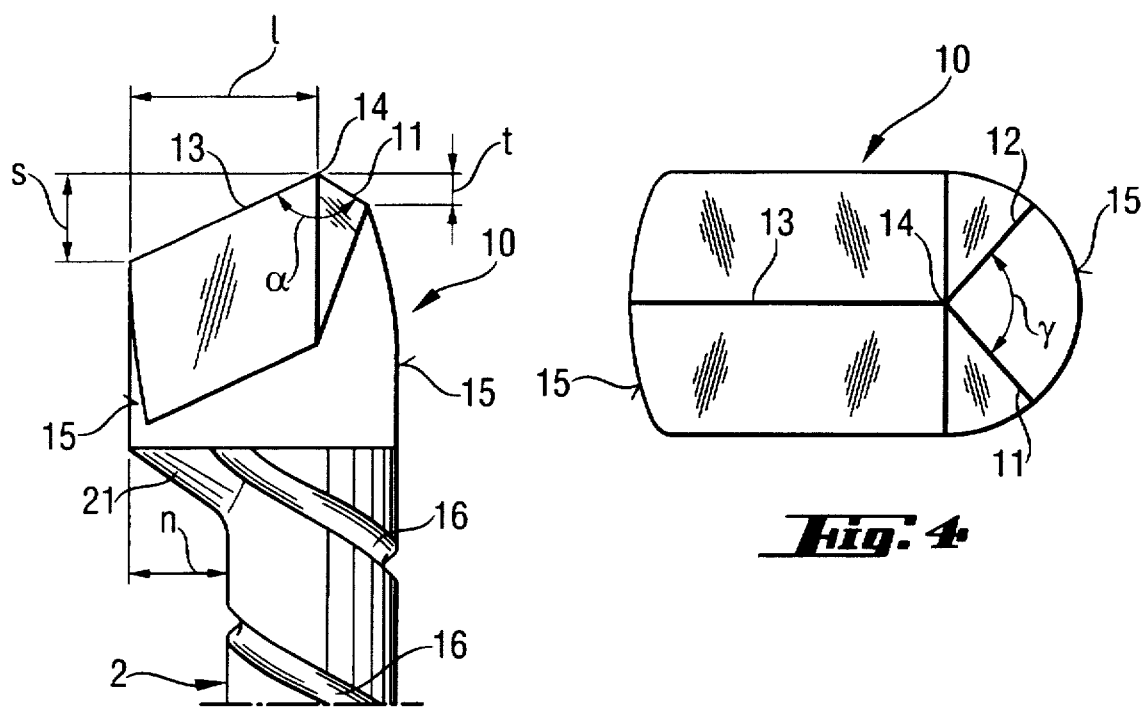
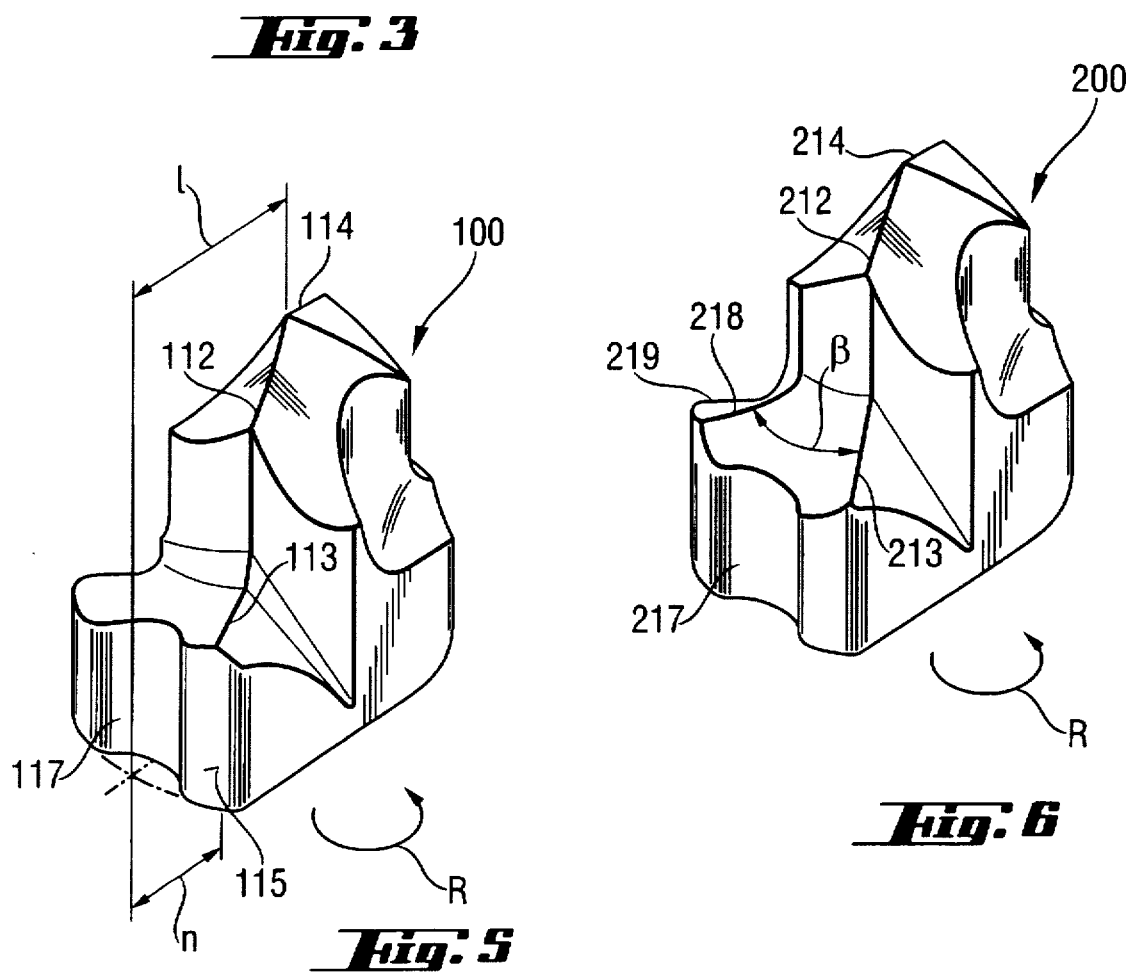

DRILL

BACKGROUND OF THE INVENTION

1. Field of the Invention

The invention relates to a drill having an elongate shaft the rear end of which is formed as a shank and at a front end of which, a drilling head with bore cutting edges is provided.

2. Description of the Prior Art

For forming attachments in different solid structural components, different processes are used. Most commonly used processes are a sequential process and a direct mounting technology. The sequential attachment processes are suited for all types of structural components. Dependent on the type of the structural component and a desired holding value, different types of attachment members are used. When a sequential process is used, first, a receiving bore is formed in a structural component with a drilling tool. The drilling tool may consist of a twist drill, a rotary rock drill, or a wood drill, which is driven by a hand-held tool having a motor-driven rotary drive and, if necessary, a percussion mechanism. After the receiving bore is formed, an attachment member, usually a dowel is inserted into the bore and is anchored there by being expanded, in most cases, by screwing into it a screw or by driving into it a mandrel. As mechanical attachment members, plastic or metal mandrels with a head, which are driven into a drilled bore with a hammer, can be used. The holding mechanism is based primarily on a frictional engagement and, in a porous brickwork, sometimes, on a formlocking connection.

When a direct mounting technology is used, a special attachment member is driven directly into a structural component with a explosive powder-charge operated setting tool. With this attachment method, a separate formation of a receiving bore for the attachment member is eliminated. The direct mounting technology is a quick process and results in attachments with a high holding value. However, the known direct mounting technology is suitable only for more or less ductile structural components such as, e.g., steel, chalky sandstone, concrete, or, if necessary, wood.

More or less brittle structural components such as, e.g., brickwork, are affected to a great extent by the explosive powder charge-operated setting tools, when the known direct mounting technology is used, are often damaged to such a degree that no acceptable attachments can be formed. Therefore, for anchoring in such structural components, essentially, only the sequential attachment processes are used. These processes improve the structural components and result in acceptable attachments with a desired holding value. However, noticeably greater expenditure of time for each attachment point should be taken into account. In addition, mostly separate tools for forming bores and for anchoring attachment members in the bores are needed, e.g., a rotary tool with a drill for forming a receiving bore and a screwing tool for screwing in an attachment screw into a dowel, with the dowel being anchored by being expanded.

Accordingly, an object of the present invention is to provide means with which an attachment member can be anchored also in brittle structural components, e.g., in a brickwork, rapidly and reliably. In particular, an object of the present invention is to provide a drill which can be used with a new type of an attachment member and a new attachment technology. At that, the sequence of forming a bore, a following setting-in of an attachment member in the bore and, finally, expansion of the attachment member should be eliminated. The necessity in a plurality of different tools for forming a bore and for subsequent anchoring of an attachment member should also be eliminated. The structural component should be improved, and attachments with a required holding value should become possible.

SUMMARY OF THE INVENTION

These and other objects of the present invention, which will become apparent hereinafter, are achieved by providing a drill including an elongate shaft the rear end of which is formed as a shank, and at the opposite front end of which a drilling head having bore cutting edges is provided. On the shaft, an advantageously annular shoulder is provided. The shoulder is located adjacent to the drilling head.

The drilling head has central cutting edges extending from a center point, which is provided substantially on an extension of a shaft axis, backward toward the circumference of the drilling head.

At least one minor cutting edge, a portion of which extending transverse to the shaft axis projects beyond a circumference of the shaft, is provided in addition to the central cutting edges. The projecting portion has a length equal from about 10% to 100% of the entire length of the minor cutting edge.

The drill according to the present invention allows anchoring, in a structural component by using direct attachment technology, a new attachment member formed as a tubular metal shaft with an axial bore and having an axial slot formed in the shaft surface and extending along the entire longitudinal extent of the shaft, and load application means provided at the trailing, in a setting direction, end section of the shaft. The construction of the tool according to the present invention permits to form a receiving bore and to synchronously drive the attachment member into the structural component with axial percussions in a single operating cycle. The drilling head of the drill is so formed that the attachment member can be pinned up on the shaft until its collar abuts the stop shoulder which is provided on the shaft. At that the drilling head projects beyond the front end of the attachment member. The stop shoulder serves for transmission of the axial percussions to the attachment member which insure that the attachment member is driven into the structural component synchronously with the formation of the bore. In the set condition of the attachment member, with the axial slot being completely closed in an extreme case, the drill can again be pulled out of the attachment member because the envelope curve of the drilling head is smaller than the inner diameter of the closed tubular attachment member. The center point of the drill prevents the drill from being displaced from its centered position when at least one asymmetrically arranged minor cutting edge engages the structural component.

It is advantageous when there are provided two central cutting edges which form with each other an angle from about 60° to about 180°, and wherein the at least one minor cutting edge extends from the center point toward a drilling head side surface located outwardly of the shaft circumference and extends, in a plan view, parallel to a bisectrix of the angle which is formed by the main cutting edges, forming, respectively, an obtuse angle with an adjacent central cutting edge.

The asymmetry of the drilling head is further emphasized by the fact that an end of the minor cutting edge located outside of the shaft circumference is spaced from the center point a distance greater than that of an end of the central cutting edge located in a region of the shaft circumference. The minor cutting edge is longer than the central cutting edge and provides for removal of the main portion of the material.

For balancing the forces acting on the central cutting edges and the minor cutting edge, advantageously, the minor cutting edge and a central cutting edge form at the center point, in a side view, an angle from about 30° to about 120°.

In a preferred, alternative embodiment of the drill, a region of the minor cutting edge, located radially closely adjacent to the shaft circumference, is offset with respect to the center point by at least 2.5 mm. In this case, the minor cutting edge extends not to the center point but is offset relative thereto and is arranged laterally with respect to the shaft circumference. The central cutting edges, together with the center point, have a very distinctive drill centering function. They alone provide for supporting the drill against an axial displacement from its centering position when the asymmetrically arranged minor cutting edge engages the structural component. The minor cutting edge provides for a percussion and shave boring of a receiving bore with a desired diameter which is greater than the diameter of the envelope curve of the drilling head. The minor cutting edge is so selected that the tubular attachment member becomes compressed in the receiving bore with a desired diameter, which should be greater than the diameter of the envelope curve of the drilling head and which is so selected that the tubular attachment member becomes compressed in the receiving bore. The resulting holding force of the attachment member is a result of a pressure force applied to the bore wall as a result of the compression of the attachment member and of the static friction value.

The drilling head can be provided with one or more minor cutting edges. For the use in a hard structural component, e.g., in a cement structural component with a hard aggregate, the two minor cutting edges advantageously form with each other an angle from 30° to 50°, preferably, about 40°.

To provide for additional removal of the bore dust, each minor cutting edge is associated with a bore dust removing groove which is formed in the side wall of the drilling head and trails the minor cutting edge in the rotational direction of the drilling head.

In order to further improve the removal of the bore dust, the shaft is formed with an elliptical or lens-shaped cross-section. The elliptical or lens-shaped cross-section of the drill shaft provides for displacement of the drilled-off bore drillings and bore dust radially outwardly and backwards as a result of the displacement action. The removing grooves, which can be impressed in the shaft, provide for additional carrying away of the bore dust. The elliptical or lens-shaped shaft geometry imparts to the drill a high torque stability and insurers, at the same time, an adequate flexibility so that the drill can be pulled out without any problem even when attachment members are pinned up at an angle on the drill shaft when sometimes a light bending in an axial direction occurs. A particular good relationship between the torque stability, on one hand, and the flexibility of the shaft, on the other hand, exists when a ratio between the larger diameter of the shaft and the smaller diameter of the shaft, which is taken in a direction perpendicular to the large diameter, is equal from about 1.8:1 to about 1.4:1.

Preferably, the shaft is formed of two parts and includes a larger diameter rear portion with a shank and a smaller size front shaft portion. The drilling head is secured at the free front end of the front shaft portion which, advantageously, has an elliptical or lens-shaped cross-section. The front shaft portion is releasably connected with the rear portion. E.g., an insertion bore, into which the smaller front shaft portion is insertable, opens into an end surface of the rear portion opposite to the shank. The end wall of the rear portion, which is adjacent to the smaller front portion, simultaneously forms the stop shoulder for the pinned-up attachment member, so that the axial percussions, which are generated by the hand-held tool, can be transmitted to the attachment member. By providing a releasable connection between the front and rear portions of the shaft, in case of excessive wear of the drilling head, the entire drill need not be replaced. It is sufficient to replace the front shaft portion with the drilling head. It is the same for the case when the rear portion, together with its shank, should be replaced. In this case also, the intact portion of the drill is used further.

The drilling head is preferably formed of a hard material. Therefore, the drilling head has a high wear resistance and has an adequate hardness so that it can form receiving bores in rigid structural components.

BRIEF DESCRIPTION OF THE DRAWINGS

The features and objects of the present invention will become more apparent, and the invention itself will be best understood from the following detailed description of the preferred embodiments when read with reference to the accompanying drawings, wherein:

FIG. 3 shows a side view of a first embodiment of a drilling head of a drill according to the invention;

FIG. 4 shows a top view of the drilling head according to FIG. 3;

FIG. 5 shows a perspective view of a second embodiment of the drilling head of a drill according to the present invention;

FIG. 6 shows a perspective view of a third embodiment of the drilling head of a drill according to the present invention;

DETAILED DESCRIPTION OF THE PREFERRED EMBODIMENTS

Figure 1:
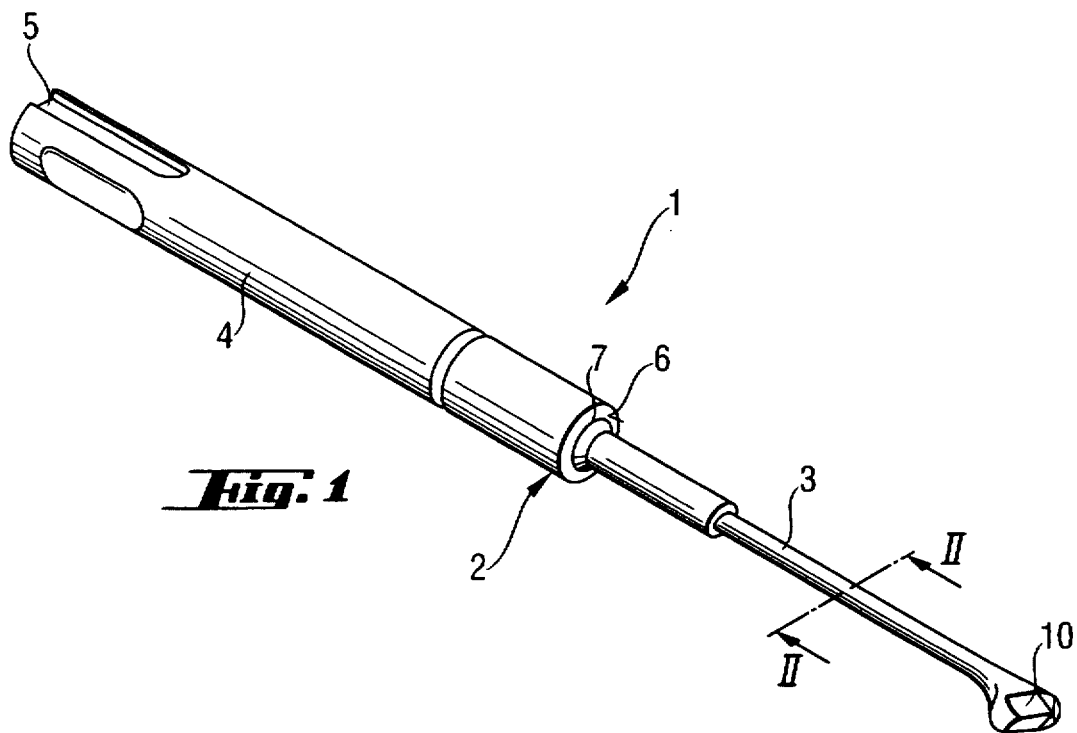
FIG. 1 shows a perspective view of a drill according to the present invention.

A drill according to the present invention is generally designated in FIG. 1 with a reference numeral 1. The drill 1 has a shaft 2 which is essentially formed of a rear portion 4 and a front portion 3. The rear portion 4 has a larger diameter than the front portion 3. In the transition region between the rear portion 4 and the front portion 3, an annular stop shoulder 6 is provided. The stop shoulder 6 is spaced from the shank 5 of the drill 1 and is located adjacent to the front portion 3 of the shaft 2.

The smaller front portion 3 and the rear portion 4 can, e.g., be integrally connected by friction welding. However, advantageously they are releasably connected with each other, with the end of the front portion 3 being inserted into the bore 7 in the end surface of the rear portion 4 of the shaft 2 and being secured there with locking means, not shown in detail. As locking means, a locking screw or the like, per se known, can be used. At its front and opposite to the shank 5, the shaft 2 is provided with a drilling head 10 which will be described in detail below.

Figure 2:
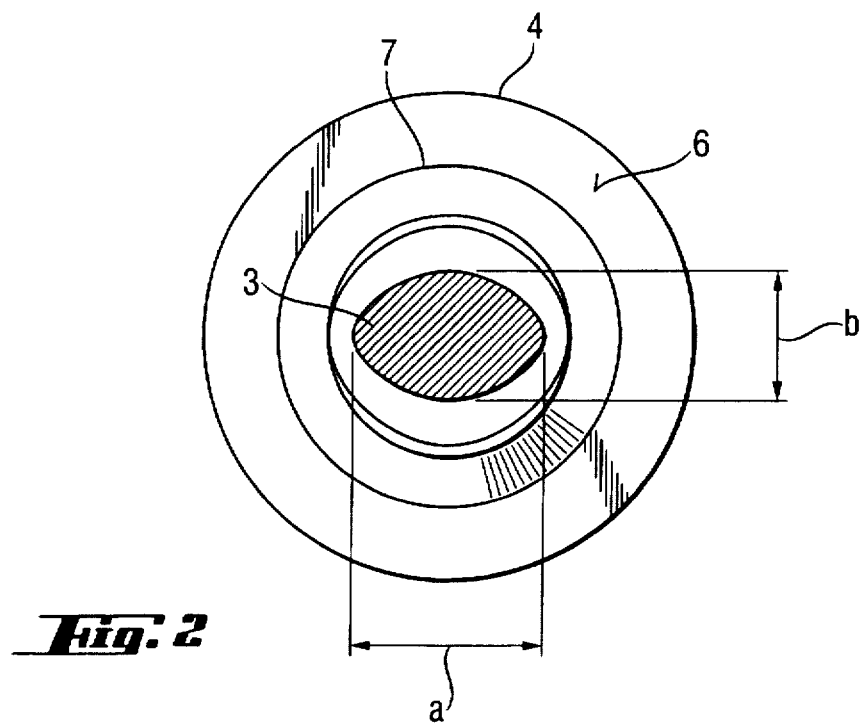
FIG. 2 shows a cross-sectional view through the drill shaft along line II—II in FIG. 1.

As it can be seen in FIG. 2, the smaller front portion 3 of the shaft has an elliptical or lens-shaped cross section. The ratio between the axial dimension a along the main axis and the axial dimension b along the minor axis is in the range from about 1.8:1 to about 1.4:1. The shaft 2 can have the same cross-section along the entire longitudinal extent of the front portion 3, however, as shown in FIG. 1, it may have the described cross-section only along a portion of the front portion 3. Therefore, both annular and elliptical transition regions are shown in FIG. 2. As mentioned above, the bore in the end surface of the rear portion 4 is designated with a reference numeral 7. The end surface also forms the stop shoulder 6.

FIG. 3 shows a first embodiment of a drilling head of the inventive drill and which is designated with a reference numeral 10. The drilling head 10 is attached to the front end of the shaft 2, e.g., is welded or soldered thereto. It has a central cutting edge 11 and at least one minor cutting edge 13 which extends from the center point 14 to the side surface 15 of the drilling head 10 and, therefore, has its upper point at the center point 14. The minor cutting edge 13 extends eccentrically to the axis of the shaft 2 and projects beyond its circumference by a length n. The length n, by which the minor cutting edge 13 extends past the circumference of the shaft 2, can be equal from about 10% to 100% of its entire longitudinal extent 1. The minor cutting edge 13 ends on the side wall 15 in a point the distance s of which from the center point is larger than the distance of the corresponding end point of the central cutting edge 11. The central cutting edge 11 and the minor cutting edge 13 form at the center point 14 an angle α from about 30° to about 120°. Though the drilling head 10 can be so attached to the shaft 2 that the lower portion of its minor cutting edge-carrying section freely projects beyond the shaft, it proved to be advantageous when the shaft 2 has, at its front end, a widening 21 which supports the lower portion of the minor cutting edge-carrying section of the drilling head 10 and which increases the connection surface between the drilling head 10 and the shaft 2. The shaft 2 is provided with discharge grooves 16 which are formed as sections of a helix and extend from the drilling head backwards.

FIG. 4 shows a plan view of the drilling head 10 shown in FIG. 3. As shown in FIG. 4, the drilling head 10 has two central cutting edges 11, 12 which extend from the center point 14 to the side surface 15 of the drilling head 10. Both main cutting edges 11, 12 form at the center point 14 an angle γ equal from about 60° to about 180°. The longer minor cutting edge 13 extends along a line forming a continuation of the bisectrix of the angle γ which is formed by the central cutting edges 11 and 12.

FIG. 5 shows a second embodiment of the drilling head 100 of a drill according to the present invention. In the embodiment shown in FIG. 5, the central cutting edges are designated with reference numerals 111 and 112. The drilling head 100 has also a minor cutting edge 113, the length n of which extends up to 100% past the circumference of the drill shaft which is not shown in detail. A section of the minor cutting edge 113 closely adjacent to the shaft circumference is offset with respect to the center point 114 at least by 2.5 mm. As shown in FIG. 5, the minor cutting edge 113 is associated with a substantially axially extending groove 117 for removing drillings and which is formed in the side surface 115 of drilling head 100. The drillings removing groove 117 is so arranged that it trails the minor cutting edge 113 in the rotational direction R. The free space in the drilling head 100 in front of the minor cutting edge 113 provides for adequate removal of drillings. In case of an unusually large yield of drillings, the drillings removal grooves 117 additionally contributes to the removal of drillings.

A further embodiment of a drilling head, which is shown in FIG. 6 and is generally designated with a reference numeral 200, corresponds to the embodiment, shown in FIG. 5, to a greatest possible extent. Therefore, corresponding elements are designated with the same last two figures which are preceded with a Figure "2" in order to distinguish the two embodiments. The essential difference between the two embodiments consists in that there are provided two minor cutting edges 213, 218 which form together an angle β equal from about 30° to about 50° and, preferably, to about 40°. Trailing in the rotational direction R of the drilling head 200, two drillings removal grooves 217, 219 are associated, respectively, with the minor cutting edges 213, 218. The drillings removal grooves 217, 219 further improve the removal of drillings.

Figure 7:
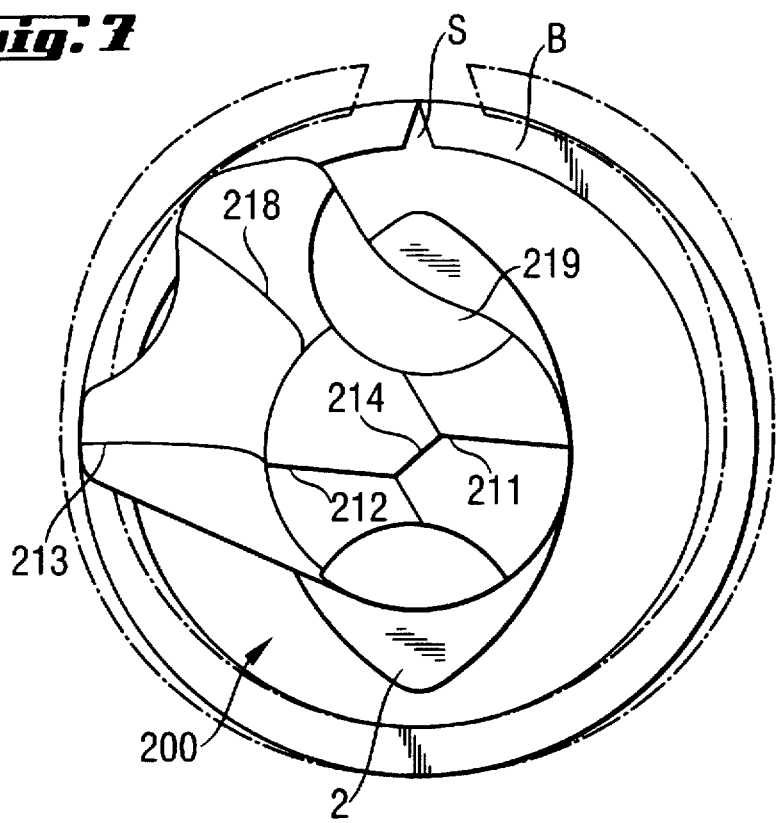
FIG. 7 shows a top view of the drilling head according to FIG. 4, together with an attachment member, in a first position of the drilling head when its axis coincides with the axis of the attachment member.
Figure 8:
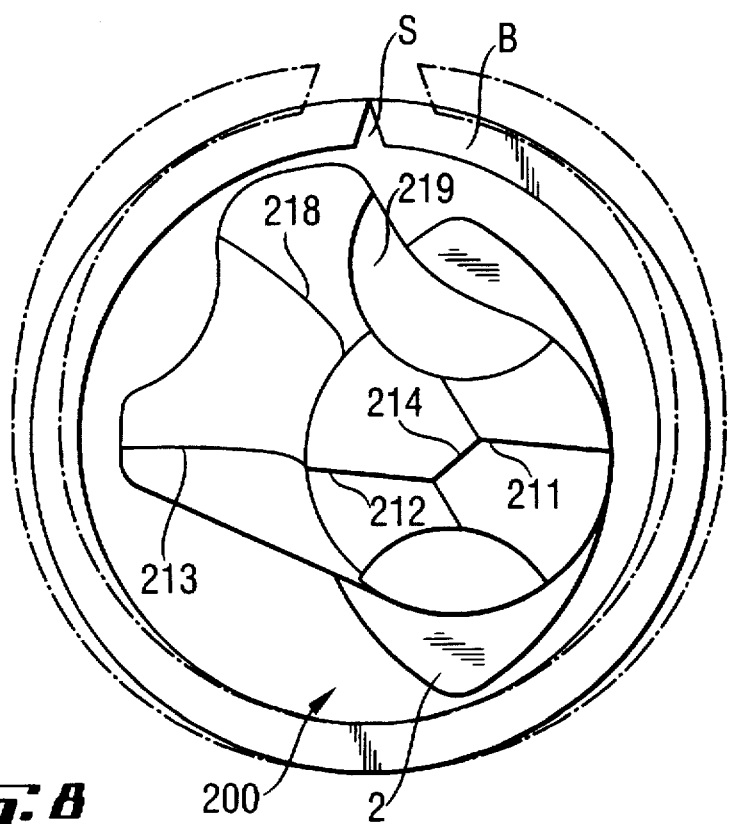
FIG. 8 shows a top view of the drilling head according to FIG. 4, together with an attachment member, in a second position of the drilling head when its axis is offset relative to the axis of the attachment member.

FIGS. 7 and 8 show plan views of the drilling head 200 of the embodiment shown in FIG. 6. The reference numerals, which indicate elements of the drilling head 200, seen in FIGS. 7 and 8, correspond to those of FIG. 6. In FIGS. 7 and 8, the reference character B designates a tubular attachment member having a slot S extending over its entire length. The attachment member B is pin up onto the drill. The drilling head 200 projects beyond the front end of the attachment member B. The attachment member B is shown in two positions. In FIGS. 7 and 8, the dash-dot lines indicate an initial position of the attachment member at which the slot S is open. The solid lines show the attachment member B in a set position in which the attachment member is radially compressed in the receiving bore. In an extreme case, the slot S is completely closed. In FIG. 7, the drilling head 200 is still in a position in the drilled bore in which the center point 214 lies on an extension of the axis of the drill and the attachment member B, and the main cutting edges 211 and 212 prevent a sidewise displacement of the tool when the minor cutting edges 213, 218 are disengaged from the surface of a structural component in which the bore is formed. The elliptical or lens-shaped shaft 2 is indicated with the reference numeral 2. It is clearly seen that the minor cutting edges form a receiving bore with a diameter which is larger than the diameter of the envelope circle of the drilling head 200. In the centered position, the drill cannot be extracted from the set attachment member. To this end, the drill should be displaced sidewise until the entire envelope circle of the drilling head is located within the inner diameter of the attachment member B, as shown in FIG. 8. In this position, the drill can be very easily withdrawn from the set attachment member.

Figure 9:
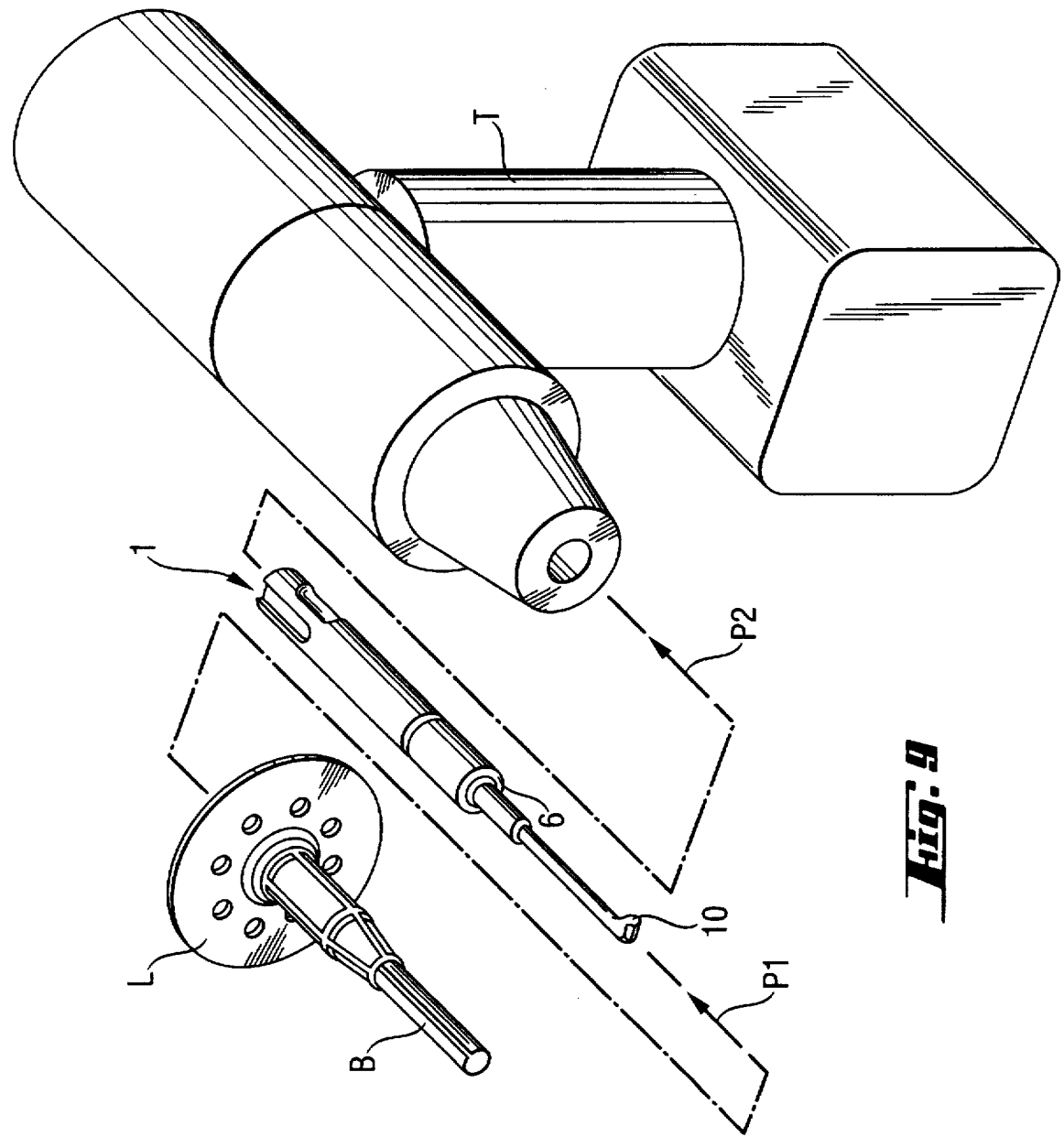
FIG. 9 shows an exploded view of an assembly for directly securing an attachment member with a drill according to the present invention.

FIG. 9 shows an assembly which permits, e.g., to attach an insulation plate to a brick wall according to the inventive method of direct mounting. The mounting assembly includes a tubular attachment member B provided with mushroom-shaped load application means L for securing the insulation plate, a drill 1 according to the present invention with a stop shoulder 6, and a drilling head 10 with an eccentric minor cutting edge, and a hand-held tool T. As the hand-held tool T, e.g., a rotary percussion drill can be used. Before the start of a mounting process, the shank of the drill 1 is inserted in the chuck of the handheld tool T. Then, the attachment member B is pushed onto the drill 1 until the drilling head 10 projects from the front end of the tubular attachment member B. The arrows P1 and P2 show the order of mounting of the drill 1 and the attachment member B. The so assembled mounting unit, consisting of the hand-held tool T, the drill 1, and the attachment member B is pressed against a structural component through the material of the insulation plate. Upon actuation of the hand-held tool, the drill 1 begins to form a receiving bore in the structural component. As soon as the front end of the tubular attachment member contacts the structural component, it is driven with axial percussions into the structural component, following the drill head 10. The axial percussions, which are generated by the hand-held tool T, are transmitted to the rear end of the tubular attachment member B via the stop shoulder 6 which, in the embodiment shown in FIG. 9, is supported inside of the load application means L. In this way, the bore is continuously formed and the attachment member B is simultaneously percussion-driven into the structural component. The slotted tubular attachment member B has, in comparison with the drill bore, a greater size and is, therefore, radially compressed. The hollow attachment member B forms a radial guide for the drill 1. The central cutting edges, which are provided on the drilling head 10, prevent the sidewise displacement of the drilling head 10 when at least one eccentric minor cutting edge engages the structural component. The axially driven tubular attachment member B pulls the load application means L into the material of the insulation plate until the large-surface head portion of the load application means abuts the upper surface of the plate, preferably along the entire surface of the head portion.

Though the present invention was shown and described with references to the preferred embodiments, various modifications thereof will be apparent to those skilled in the art and, therefore, it is not intended that the invention be limited to the disclosed embodiments or details thereof, and departure can be made therefrom within the spirit and scope of the appended claims.

What is claimed is:

1. A drill, comprising:
   an elongate shaft (2) a rear end of which is formed as a shank (5), and having a shoulder (6); and
   a drilling head (10) provided at a front end of the shaft (2) and having central cutting edge means (11, 12) extending from a leading center point (14), which is provided substantially on an extension of a shaft axis, backward toward a circumference of the drilling head, and at least one minor cutting edge (13) a portion (n) of which extending transverse to the shaft axis projects beyond a circumference of the shaft (2), the projecting portion (n) having a length equal from about 10% to 100% of an entire length of the minor cutting edge (13).

2. A drill according to claim 1, wherein the shoulder (6) provided on the shaft (2) is annular.

3. A drill according to claim 1, wherein the central cutting edge means (11, 12) has two central cutting edges which form with each other an angle ($\gamma$) from about 60° to about 180°, and wherein the at least one minor cutting edge (13) extends from the center point (14) toward a side surface (15) of the drilling head (10) located outwardly of the shaft circumference and extends, in a plan view, parallel to a bisectrix of the angle, which is formed by the central cutting edges (11, 12), forming, respectively, an obtuse angle with an adjacent central cutting edge (11, 12).

4. A drill according to claim 3, wherein the minor cutting edge (13) extends, in the plan view, along a line forming an extension of the bisectrix.

5. A drill according to claim 3, wherein an end of the minor cutting edge (13) located outside of the shaft circumference is spaced from the center point (14) a distance (s) greater than a distance between an end a respective central cutting edge (11, 12), located in a region of the shaft circumference, and the center point (14).

6. A drill according to claim 3, wherein the minor cutting edge (13) and a central cutting edge (11) form at the center point (14), in a side view, an angle ($\alpha$) from about 30° to about 180°.

7. A drill according to claim 1, wherein a region of the at least one minor cutting edge (113; 213, 218) closely adjacent to the shaft circumference is offset with respect to the center point (14) by at least 2.5 mm.

8. A drill according to claim 7, wherein the drilling head (10) comprises two minor cutting edges (213, 218) forming with each other an angle ($\beta$) from about 30° to about 50°.

9. A drill according to claim 8, wherein the angle ($\beta$) formed by the two minor cutting edges is equal to about 40°.

10. A drill according to claim 7, wherein the drilling head (100; 200) further comprises a drillings removal groove (117; 217, 219) associated with the at least one minor cutting edge (113; 213, 218) and trailing the at least one minor cutting edge (113; 213, 218) in a rotational direction of the cutting head (100; 200), the drillings removal groove (117; 217, 219) extending substantially axially in a side surface (115; 215) of the drilling head (100, 200).

11. A drill according to claim 1, wherein the shaft (2) has one of an ellipse-shaped cross-section and a lens-shaped cross-section, and wherein a ratio between a larger diameter (a) of the shaft (2) and a smaller diameter (b) which extends perpendicular to the larger diameter (a), is equal from about 1.8:1 to about 1.4:1.

12. A drill according to claim 1, wherein the shaft (2) has drillings removing grooves (16) extending in a form of a helix toward the rear end of the shaft (2).

13. A drill according to claim 1, wherein the shaft (2) is formed of a rear portion (4) provided with a shank (5), and a front portion (3) releasably connected with the rear portion (4) and having a size smaller than a diameter of the rear portion (4), with the drilling head (10) being attached at the free front end of the front portion (4), and wherein the stop shoulder (6) is provided at an end of the rear portion (4) remote form the shank.

* * * * *